US012130117B2

(12) United States Patent
Clermont et al.

(10) Patent No.: US 12,130,117 B2
(45) Date of Patent: Oct. 29, 2024

(54) ALIGNMENT MECHANISM

(71) Applicant: Sheltered Wings, Inc., Barneveld, WI (US)

(72) Inventors: Todd Clermont, Barneveld, WI (US); Ben Farrell, Barneveld, WI (US)

(73) Assignee: Sheltered Wings, Inc., Barneveld, WI (US)

( * ) Notice: Subject to any disclaimer, the term of this patent is extended or adjusted under 35 U.S.C. 154(b) by 457 days.

(21) Appl. No.: 17/585,832

(22) Filed: Jan. 27, 2022

(65) Prior Publication Data

US 2022/0244018 A1  Aug. 4, 2022

Related U.S. Application Data

(60) Provisional application No. 63/143,391, filed on Jan. 29, 2021.

(51) Int. Cl.
*F16M 11/12* (2006.01)
*F41G 1/473* (2006.01)
*F41G 11/00* (2006.01)

(52) U.S. Cl.
CPC ............. *F41G 1/473* (2013.01); *F16M 11/12* (2013.01); *F41G 11/001* (2013.01)

(58) Field of Classification Search
CPC ....... F41G 1/473; F41G 11/001; F16M 11/12; G01C 3/00
See application file for complete search history.

(56) References Cited

U.S. PATENT DOCUMENTS

| 4,200,989 | A | * | 5/1980 | Brouthers | ................. F41G 1/26 42/137 |
| 4,360,974 | A | * | 11/1982 | de Cuissart | ............ B23Q 1/545 33/645 |
| 4,374,497 | A | | 2/1983 | Harmand | |
| 4,409,738 | A | * | 10/1983 | Renander | ............... G02B 7/004 89/200 |

(Continued)

FOREIGN PATENT DOCUMENTS

EP  0051574 B1  1/1985

OTHER PUBLICATIONS

International Search Report and Written Opinion issued for International Application No. PCT/US2022/013991 dated May 4, 2022, 20 pages.

(Continued)

*Primary Examiner* — Michelle Clement
(74) *Attorney, Agent, or Firm* — Husch Blackwell LLP

(57) ABSTRACT

An alignment mechanism has a base with a front right quadrant, a front left quadrant, a rear right quadrant, and a rear left quadrant. The base further defines a yaw axis and a pitch axis. A ball and socket linkage is located on the base at either the front right quadrant or front left quadrant at the intersection of the yaw axis and the pitch axis. A pressure plate assembly is also on the bottom surface of the base at the other of the front right quadrant and front left quadrant. A spring is in contact with one of the rear right quadrant and rear left quadrant and kitty-corner with the ball and socket linkage, with a yaw alignment surface on the other of the rear right quadrant and rear left quadrant. A pitch alignment surface is also on one of the rear right quadrant and rear left quadrant.

20 Claims, 4 Drawing Sheets

(56) References Cited

U.S. PATENT DOCUMENTS

| | | | | |
|---|---|---|---|---|
| 4,606,131 | A * | 8/1986 | Domian | F41G 1/16 42/137 |
| 4,691,442 | A * | 9/1987 | Center | F41G 1/17 42/137 |
| 4,742,636 | A * | 5/1988 | Swan | F41G 11/006 42/126 |
| 4,799,325 | A * | 1/1989 | Booze | F41G 11/003 42/137 |
| 4,920,654 | A * | 5/1990 | Sanders | F41G 1/16 42/142 |
| 5,033,219 | A * | 7/1991 | Johnson | F41G 1/35 42/126 |
| 5,086,566 | A * | 2/1992 | Klumpp | F41G 11/003 42/126 |
| 5,388,335 | A * | 2/1995 | Jung | F41G 1/26 42/138 |
| 5,813,159 | A * | 9/1998 | Kay | F41G 1/30 42/114 |
| 7,121,037 | B2 * | 10/2006 | Penney | F41G 11/001 42/126 |
| 7,181,882 | B2 * | 2/2007 | Woodbury | F41G 1/42 42/137 |
| 7,526,890 | B1 * | 5/2009 | Keng | F41G 1/26 42/144 |
| 7,610,712 | B2 * | 11/2009 | Ertl | F41G 1/10 42/137 |
| 8,413,365 | B2 * | 4/2013 | Jung | F41G 11/003 42/137 |
| 8,448,374 | B2 * | 5/2013 | Samson | F41G 11/003 42/138 |
| 9,157,698 | B2 * | 10/2015 | Cosentino | F41G 11/006 |
| 9,225,148 | B2 * | 12/2015 | Arnone | H01S 5/02325 |
| 10,254,532 | B2 * | 4/2019 | Collin | G02B 23/10 |
| 10,605,565 | B1 * | 3/2020 | Geissele | F41G 1/17 |
| 10,704,862 | B2 * | 7/2020 | Chung | F41G 3/065 |
| 10,942,005 | B2 * | 3/2021 | Teetzel | F41G 1/35 |
| 11,512,929 | B2 * | 11/2022 | Olmsted | G02B 27/0189 |
| 11,519,694 | B1 * | 12/2022 | Hamm | F41G 1/467 |
| 2008/0092424 | A1 * | 4/2008 | Keng | F41G 1/18 42/137 |
| 2010/0325934 | A1 | 12/2010 | Liu | |
| 2011/0154713 | A1 | 6/2011 | Jung et al. | |
| 2015/0198415 | A1 * | 7/2015 | Campean | F41G 1/30 42/137 |
| 2015/0198421 | A1 * | 7/2015 | Crispin | F41G 11/006 42/126 |
| 2022/0178653 | A1 * | 6/2022 | Connolly | F41G 1/30 |
| 2022/0244018 | A1 * | 8/2022 | Clermont | F16M 11/12 |
| 2023/0054268 | A1 * | 2/2023 | Schulte | F41G 1/30 |

OTHER PUBLICATIONS

International Preliminary Report on Patentability for PCT/US2022/013991, Dated Jul. 31, 2023, 5 pages.

* cited by examiner

ALIGNMENT MECHANISM

CROSS-REFERENCE TO RELATED APPLICATIONS

This application is a non-provisional patent application of and claims priority to U.S. Provisional Patent Application No. 63/143,391 filed Jan. 29, 2021, which is incorporated herein by reference in its entirety.

FIELD

The disclosure relates to an alignment mechanism. In one embodiment, the disclosure relates to an adjustment mechanism for a rangefinder.

BACKGROUND

Rangefinders assist shooters in determining the distance to a target. Rangefinders can be stand-alone or mounted to a firearm, such as a rifle. Mounted rangefinders are first secured to a weapon and then adjusted such that the rangefinder aiming point is in co-alignment with the weapon's aiming point. After firing, however, the recoil of the weapon tends to move the aiming point of existing mounted rangefinders. The mounted rangefinder must then be readjusted after each time the weapon is fired. Similarly, transportation of the weapons when the rangefinder is mounted causes misalignment of the rangefinder. If the mounted rangefinder is not readjusted prior to firing, the rangefinder can give inaccurate readings. Readjusting a mounted rangefinder also takes time away from shooting.

For the reasons discussed above, having a mounted rangefinder with an aiming point that does not move upon firing or transport of a firearm is a big advantage. Thus, there is a large need for an alignment mechanism for a mounted rangefinder that can address these concerns.

SUMMARY

In one embodiment, the disclosure provides an alignment mechanism. In accordance with embodiments of the disclosure, an alignment mechanism comprises a base having a front right quadrant, a front left quadrant, a rear right quadrant, and a rear left quadrant, wherein the base further defines a yaw axis and a pitch axis; a ball and socket linkage on the base at one of the front right quadrant and front left quadrant, the ball and socket linkage at the intersection of the yaw axis and the pitch axis; a pressure plate assembly at the lower surface of the base at the other of the one of the front right quadrant and front left quadrant; a spring in contact with one of the rear right quadrant and the rear left quadrant; a yaw alignment surface at the other of the one of the rear right quadrant and the rear left quadrant; and a pitch alignment surface on one of the rear right quadrant and the rear left quadrant.

In an embodiment, the base is pivotable about the yaw axis and rotatable about the pitch axis. In some embodiments, the ball and socket linkage is kitty-corner to the yaw alignment surface. In an embodiment, the ball and socket linkage is on the lower surface of the front left quadrant. In another embodiment, the spring is in contact with the rear left quadrant. In accordance with another embodiment, the spring is in contact with a spring-contracting surface, wherein the spring-contacting surface is angled from 25° to 65° relative to a bottom surface of the base.

In another embodiment, the disclosure provides a rangefinder. In accordance with embodiments of the disclosure, a rangefinder comprises a housing; a rangefinder chassis contained within the housing; and an alignment mechanism contained within the housing, wherein the alignment mechanism comprises a base having a front right quadrant, a front left quadrant, a rear right quadrant, and a rear left quadrant, wherein the base further defines a yaw axis and a pitch axis; and a ball and socket linkage on the base at one of the front right quadrant and front left quadrant, the ball and socket linkage at the intersection of the yaw axis and the pitch axis; a pressure plate assembly on the lower surface of the base at the other of the one of the front right quadrant and front left quadrant; a spring secured between the housing and a spring-contacting surface on one of the rear right quadrant and the rear left quadrant; a yaw alignment surface on the other of the one of the rear right quadrant and the rear left quadrant; and a pitch alignment surface on one of the rear right quadrant and the rear left quadrant.

In an embodiment, the base is pivotable about the yaw axis and rotatable about the pitch axis. In another embodiment, the ball and socket linkage is on the lower surface of the front left quadrant. In yet another embodiment, the spring-contacting surface is at the rear left quadrant. In a further embodiment, the spring-contacting surface is angled from 25° to 65° relative to a bottom surface of the base.

In accordance with another embodiment, the rangefinder further comprises a yaw adjustment plunger which passes through a first opening in the housing to contact the yaw alignment surface. In an embodiment, axial movement of the yaw adjustment plunger into the housing causes the spring to increase force in a yaw direction on the spring-contacting surface. In a further embodiment, axial movement of the yaw adjustment plunger into the housing causes the base to pivot about the yaw axis from a first position to a second position.

In another embodiment, the rangefinder further comprises a pitch adjustment plunger which passes through a second opening in the housing to contact the pitch alignment surface. In an embodiment, the pitch adjustment plunger into the housing causes the spring to increase force in a pitch direction on the spring-contacting surface. In a further embodiment, axial movement of the pitch adjustment plunger into the housing causes the base to rotate about the pitch axis relative to the horizontal adjustment plate from a first position to a second position.

In an embodiment, the spring exerts an amount of force against the spring-contacting surface over a range of motion of the base.

In an embodiment, the rangefinder is configured to secure to a firearm. In an embodiment, the firearm is a rifle.

BRIEF DESCRIPTION OF THE DRAWINGS

Embodiments of the disclosure are disclosed with reference to the accompanying drawings and are for illustrative purposes only. The disclosure is not limited in its application to the details of construction or the arrangement of the components illustrated in the drawings. The disclosure is capable of other embodiments or of being practiced or carried out in other various ways. Like reference numerals are used to indicate like components. In the drawings.

Figure 1A:
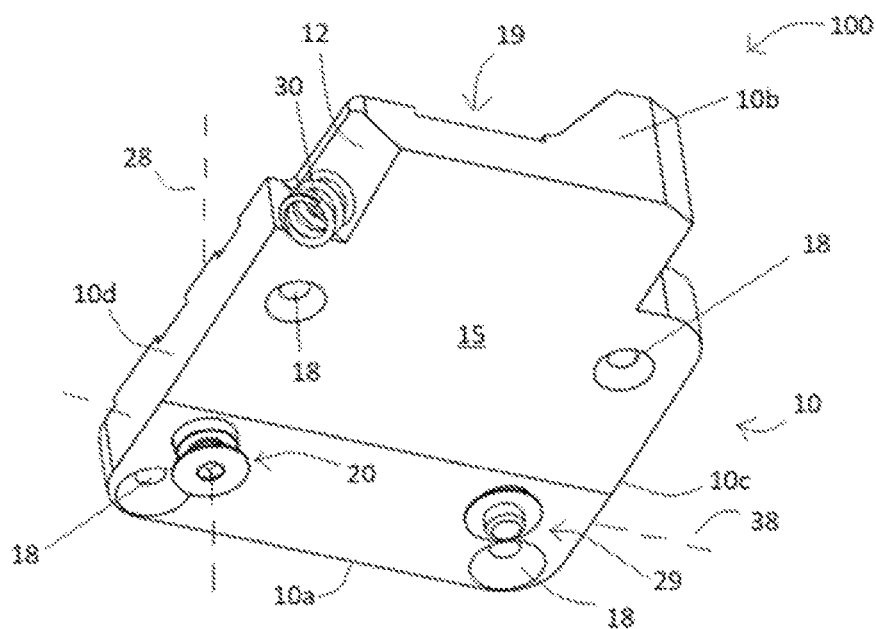
FIG. 1A is a bottom rear perspective view of an alignment mechanism in accordance with embodiments of the disclosure.

Before explaining embodiments of the disclosure in detail, it is to be understood that the disclosure is not limited in its application to the details of construction and the arrangement of the components set forth in the following description or illustrated in the drawings. The technology of this present disclosure is capable of other embodiments or being practiced or carried out in various ways. Also, it is to be understood that the phraseology and terminology employed herein is for the purpose of description and should not be regarded as limiting.

DETAILED DESCRIPTION

The apparatuses and methods disclosed herein will now be described more fully hereinafter with reference to the accompanying drawings, in which embodiments of the disclosure are shown. The apparatuses and methods disclosed herein may, however, be embodied in many different forms and should not be construed as limited to the embodiments set forth herein. Rather, these embodiments are provided so that the disclosure will be thorough and complete and will fully convey the scope of the invention to those skilled in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, melt index, temperature, etc., is from 100 to 1,000, it is intended that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure.

Spatial terms, such as "beneath," "below," "lower," "above," "upper," and the like, may be used herein for ease of description to describe one element's or feature's relationship to another element(s) or feature(s) as illustrated in the figures. It will be understood that the spatially relative terms are intended to encompass different orientations of device in use or operation in addition to the orientation depicted in the figures. For example, if the device is turned over, elements described as "below" or "beneath" other elements or features would then be orientated "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the term "and/or" includes any and all combinations of one or more of the associated listed terms. For example, when used in a phrase such as "A and/or B," the phrase "and/or" is intended to include both A and B; A or B; A (alone); and B (alone). Likewise, the term "and/or" as used in a phrase such as "A, B and/or C" is intended to encompass each of the following embodiments: A, B and C; A, B, or C; A or C; A or B; B or C; A and C; A and B; B and C; A (alone); B (alone); and C (alone).

It will be understood that when an element or layer is referred to as being "on," "connected to," or "coupled to" another element or layer, it can be directly on, connected to or coupled to the other element or layer. Alternatively, intervening elements or layers may be present. In contrast, when an element or layer is referred to as being "directly on," "directly connected to," or "directly coupled to" another element or layer, there are no intervening elements or layers present.

As used herein, the term "firearm" refers to any device that propels an object or projectile in a controllable manner. Firearms include, but are not limited to, handguns, pistols, rifles, machine guns, and gatling guns, inclusive of single shot firearms, semi-automatic firearms, and fully automatic firearms.

Figure 1B:
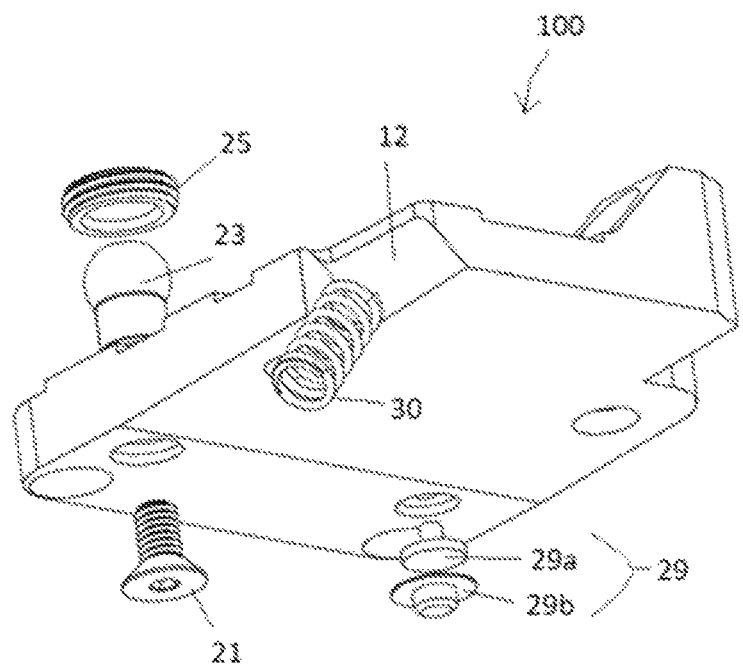
FIG. 1B is an exploded view thereof.

FIGS. 1A and 1B illustrate an alignment mechanism 100, in accordance with embodiments of the disclosure. The alignment mechanism 100 includes a base 10 is a plate-like structure having a front portion 10a and a rear portion 10b, and a right portion 10c and a left portion 10d. The overlap of these portions creates four quadrants—a front right quadrant, a front left quadrant, a rear right quadrant and a rear left quadrant. In the embodiment shown, the front portion 10a is wider than the rear portion 10b, forming a somewhat dovetail shape. In other embodiments, the front portion 10a may be narrower than the rear portion 10b. In further embodiments, the base 10 may have other shapes, including but not limited to, rectangular, triangular, ovular, or polygonal. The bottom surface 15 includes a ball and socket linkage 20 at the front left quadrant and a pressure plate 29 assembly at the front right quadrant. As shown in FIGS. 1A-1B, the ball and socket linkage 20 secures to the base 10 at opening 20a. As shown in FIGS. 1A-1B, the pressure plate assembly 29 provides a point of contact for the base 10 to bias against and is composed of a domed piece 29b (which is fixed to the housing) and a plate 29a which is fixed to the base 10. Additional openings 18 pass through the base 10 to secure a rangefinder chassis (not shown).

A spring-contacting surface 12 is formed at the rear left quadrant of the base 10. The spring 30 is sandwiched between the housing (not shown) and the spring-contacting surface 12. As shown in FIGS. 1A, 1B, and 3-4, the spring-contacting surface 12 is angled relative to the lower surface of the base 10. In order for the spring (30, not shown) to apply adequate force in both the up/down and left/right directions, the spring-contacting surface 12 must be at an angle between perpendicular to the movement of the yaw adjustment plunger (not shown) and perpendicular to the pitch adjustment plunger (not shown). In an embodiment, the spring-contacting surface 12 is at an angle from 25°, or 30° or 35°, or 40°, or 45° to 50°, or 55°, or 60°, or 65°. In an embodiment, the spring-contacting surface 12 is at an angle from 40°, or 41°, or 42°, or 43°, or 44° to 45°, or 46°, or 47°, or 48°, or 49°, or 50°.

Figure 2:
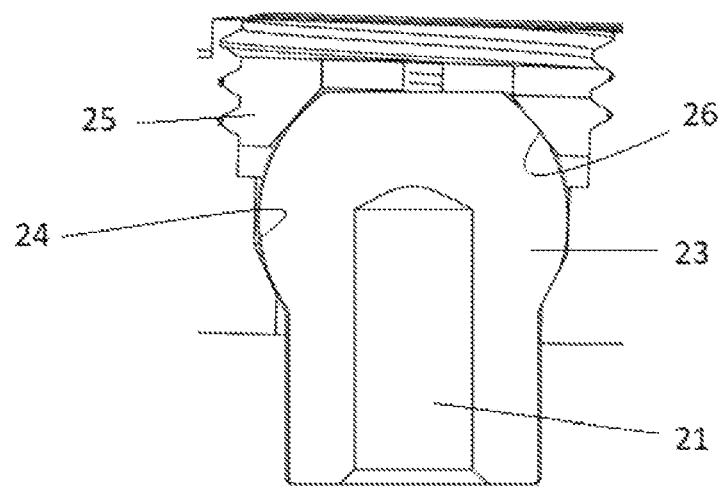
FIG. 2 is a cross-sectional view of a ball and socket linkage used in the alignment mechanism of FIG. 1.

As shown in FIGS. 1B and 2, the ball and socket linkage includes a pin 21, a ball 23, and a locking ring 25. The socket is formed by the locking ring 25 in combination with the interior surface of the aperture in the base 10 into which the ball and socket linkage 20 is disposed. The pin 21 works along with the bearing surface 26 of the locking ring and bearing surface 24 of the interior surface of the aperture to prevent the ball 23 from disengaging the socket. While the ball and socket linkage 20 is shown at the bottom surface of the front left quadrant, it will be appreciated that alternative placements of the ball and socket linkage are functional as well. For example, in some embodiments, the ball and socket linkage 20 may be provided on an upper or side surface of the front left quadrant or front right quadrant, and the specific movement of the ball and socket, relative to one another, will depend on the arrangement of the other components of the alignment mechanism. However, for purposes of illustration, the ball and socket linkage 20 will be shown and described as on the bottom side of the front left quadrant.

The use of a single ball and socket linkage facilitates movement of the alignment mechanism 100 along all three degrees of rotational movement—yaw (pivoting left and/or right), pitch (tipping up and/or down) and roll (tilting left and/or right). It will be appreciated that adjusting the yaw will adjust the horizontal aim of the rangefinder, while adjusting the pitch will adjust the vertical aim of the rangefinder. While pure roll movement will not necessarily alter the aimpoint of the alignment mechanism 100, the mechanism 100 exhibits compound angular movement along with roll movement, which can change the aimpoint of the alignment mechanism 100. Therefore, in the embodiment shown, the ball and socket linkage 20 creates a pivot point at the intersection of the yaw axis 28 and pitch axis 38.

Figure 3:
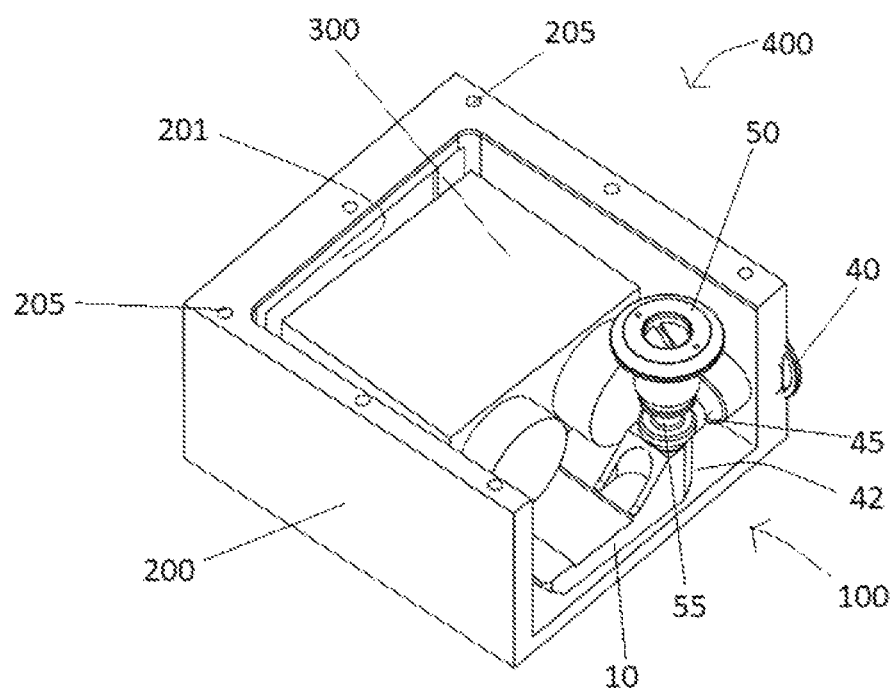
FIG. 3 is a rear left perspective view of the alignment mechanism of FIG. 1 in use with a rangefinder chassis in a housing in accordance with embodiments of the disclosure.
Figure 4:
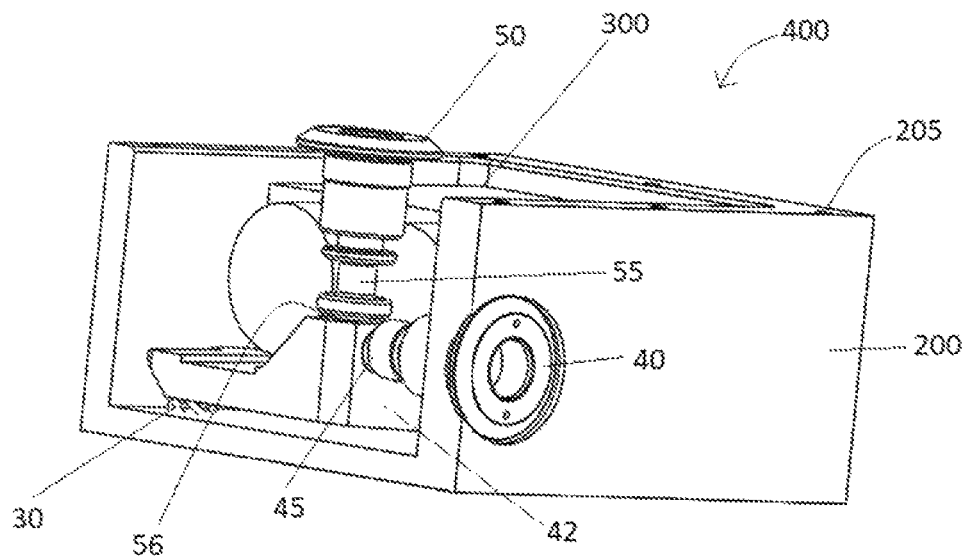
FIG. 4 is a right side view thereof.

The upper surface 19 of the base 10 has structures and/or contours to match the lower surface geometry of a rangefinder chassis 300 and secure a rangefinder chassis 300 to the base 10, as shown in FIGS. 3 and 4.

FIGS. 3 and 4 further illustrate the alignment mechanism 100 of FIGS. 1A-2 in use with a rangefinder chassis 300 and contained within a housing 200 (upper and rear housing portions removed for clarity) to form a rangefinder 400 for use with a firearm. In the embodiment shown, the housing 200 is provided as a plurality of pieces and held together using pins or screws which engage openings 205. However, in further embodiments, the housing may be provided with more or fewer pieces and/or held together using different structures or devices. The front portion of the housing 200 includes a window 201 which is approximately the same size or larger than the front side of the rangefinder chassis 300.

The housing 200 further includes two openings—a first opening (not shown) at the right side and a second opening (not shown) at the right rear upper portion of the housing 200. The openings each including an adjustment plunger engaged therein such that the adjustment plungers are able to be axially movable within the openings to adjust the yaw and pitch of the rangefinder chassis 300.

Figure 5:
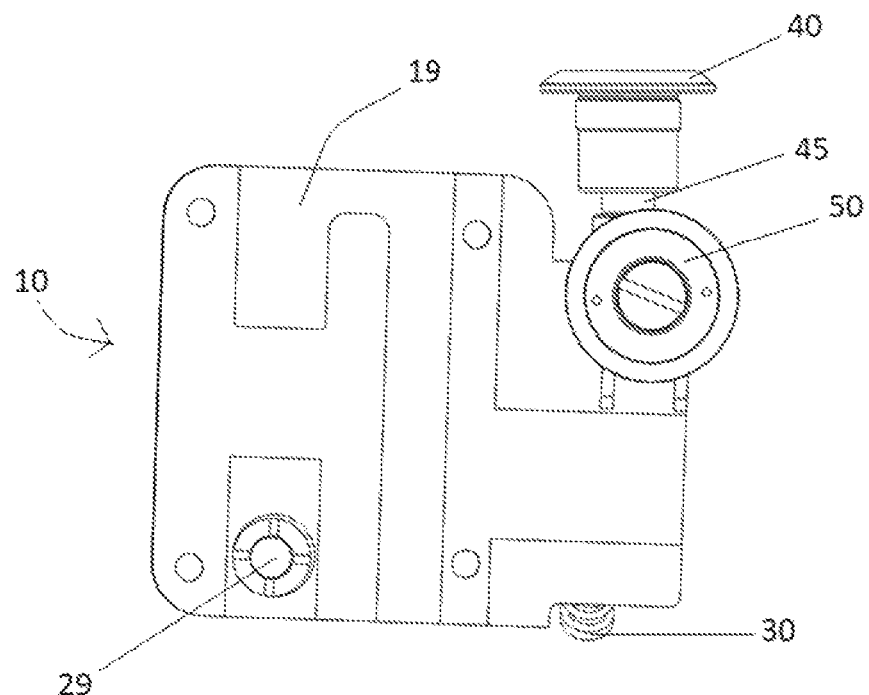
FIG. 5 is a schematic drawing showing yaw adjustment of an alignment mechanism in accordance with embodiments of the disclosure.

In particularly, and with reference to FIGS. 3-5, the first opening (not shown) is at the right side of the housing 200 at the rear. A yaw (or horizontal) adjustment plunger 40 engages the first opening. The interior end surface 45 of the yaw adjustment plunger 40 contacts a yaw (or horizontal) alignment surface 42 on the rear right quadrant of the base 10.

As shown in FIG. 5, the yaw adjustment plunger 40 is threaded within the first opening, and the axial position of the yaw adjustment plunger 40 is manipulated by a simple screw adjustment. In other embodiments, different structures and/or mechanisms can be used to allow for adjustment of the axial position of the plunger, such as, for example, structures which allow for tool-free adjustment of the plunger.

To adjust the horizontal alignment of the rangefinder, the axial position of the yaw adjustment plunger 40 is changed. Moving the yaw adjustment plunger 40 further into the housing 200 causes the interior end surface 45 to push against the yaw alignment surface 42. As the yaw adjustment plunger 40 continues to push against the yaw alignment surface 42, the spring 30 is further provides additional force in the horizontal direction, and the base 10 pivots at the ball and socket linkage 20 about a yaw axis 28. In the particular embodiment shown, in which the yaw alignment surface (not shown) is at the right rear quadrant of the base 10 and the spring 30 is on the left rear quadrant of the base 10, increasing the force of the spring 30 against the spring-contacting surface 12 (i.e., moving the yaw adjustment plunger 40 further into the housing) causes the base 10 to pivot clockwise. To adjust the aim of the rangefinder in the opposite direction, the yaw adjustment plunger 40 is moved outward, thereby relieving pressure on the yaw alignment surface and allowing the spring 30 to reduce force in the horizontal direction.

In the embodiment shown, the spring 30 is shown as a standard coil compression spring. However, in further embodiments, a different type of spring may be used. Exemplary springs include, but are not limited to, coiled compression springs, coiled extension springs, variable springs, machined springs, volute springs, and volumes of elastomeric materials (i.e., a material which regains its original shape after a load or force is removed from the material) such as rubbers.

Importantly, the spring 30 will never be in a fully relaxed state. There will always be an amount of force exerted on the spring-contacting surface 12 in order to preserve alignment. For example, in the embodiment shown in which the spring 30 is a coil compression spring, as the spring 30 is allowed to relax, it pushes the base 10 so that it pivots counterclockwise about the yaw axis 28. It will be appreciated that the opposite will occur should the position of the yaw alignment surface 42 and spring 30 be reversed.

In order to accomplish rotation about the yaw axis 28, which requires pivoting at the ball and socket linkage 20, the domed piece 29b must be slidable against the plate 29a. In contrast, in order to provide a pivot point for yaw movement, the ball and socket linkage 20 is fixed to the housing 200.

Figure 6:
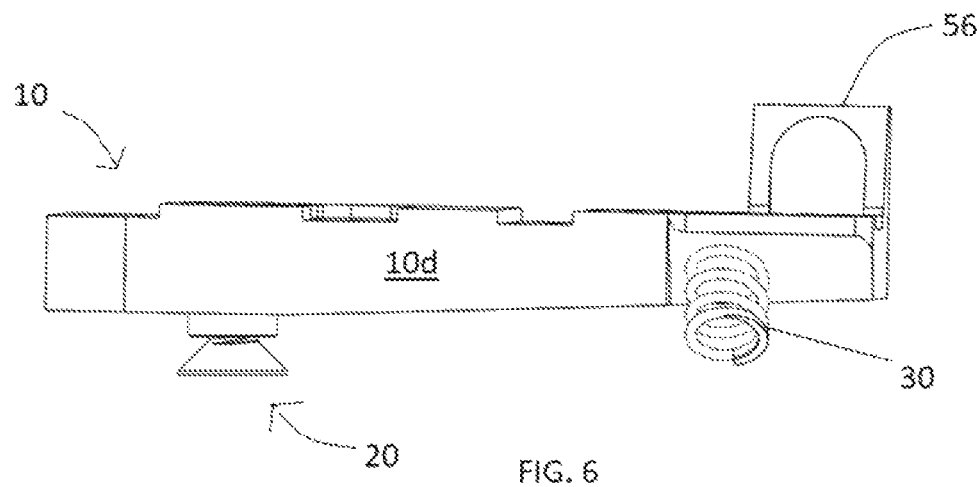
FIG. 6 is a schematic drawing showing pitch adjustment of an alignment mechanism in accordance with embodiments of the disclosure.

FIG. 6 is a left side view of the alignment mechanism 100 shown within a housing 200. The housing 200 includes a second opening (not shown) at the top of the housing 200 at the rear. Referring to FIGS. 4-6, a pitch (or vertical) adjustment plunger 50 engages the second opening. The interior end surface 55 of the pitch adjustment plunger 50 contacts a pitch (or vertical) alignment surface 56 on the upper surface of the base 10 at the rear right quadrant. For clarity, the pitch adjustment plunger 50 has been omitted from FIG. 6.

As shown in FIGS. 4-5, the pitch adjustment plunger 50 is threaded within the second opening, and the axial position of the pitch adjustment plunger 50 is manipulated by a simple screw adjustment. In other embodiments, different structures and/or mechanisms can be used to allow for adjustment of the axial position of the plunger, such as, for example, structures which allow for tool-free adjustment of the plunger.

To adjust the vertical alignment of the rangefinder 300 using the alignment mechanism 100, the axial position of the pitch adjustment plunger 50 is changed. Moving the pitch adjustment plunger 50 further into the housing 200 causes the interior end surface 55 of the pitch adjustment plunger 50 to push against the pitch alignment surface 56. As the pitch adjustment plunger 50 continues to push against the pitch alignment surface 56, the spring 30 provides additional force in the vertical direction, and the base 10 pivots at the ball and socket linkage 20 about a pitch axis 38, which is nearly perpendicular, or perpendicular, to the yaw axis 28. In the particular embodiment shown, in which the pitch alignment surface 56 is on the upper surface of the base 10 near the right rear and the spring 30 is on the left side of the base 10, increasing the force of the spring 30 against the spring-contacting surface 12 (i.e., moving the pitch adjustment plunger 50 further into the housing) causes the base 10 to pivot its front end upward. To adjust the aim of the rangefinder in the opposite direction, the pitch adjustment plunger 50 is moved outward, thereby relieving pressure on the pitch alignment surface and allowing the spring 30 to reduce force in the vertical direction.

Importantly, as discussed with reference to yaw adjustment, the spring 30 is not in a fully relaxed state. There will always be an amount of force exerted on the spring-contacting surface 12 in order to preserve alignment. For example, in the embodiment shown in which the spring 30 is a coil compression spring, as the spring 30 is allowed to relax, it pushes the base 10 so that it pivots downward about the pitch axis 38. It will be appreciated that the opposite will occur should the pitch alignment surface be positioned at the front portion 10a of the base 10.

Figure 7:
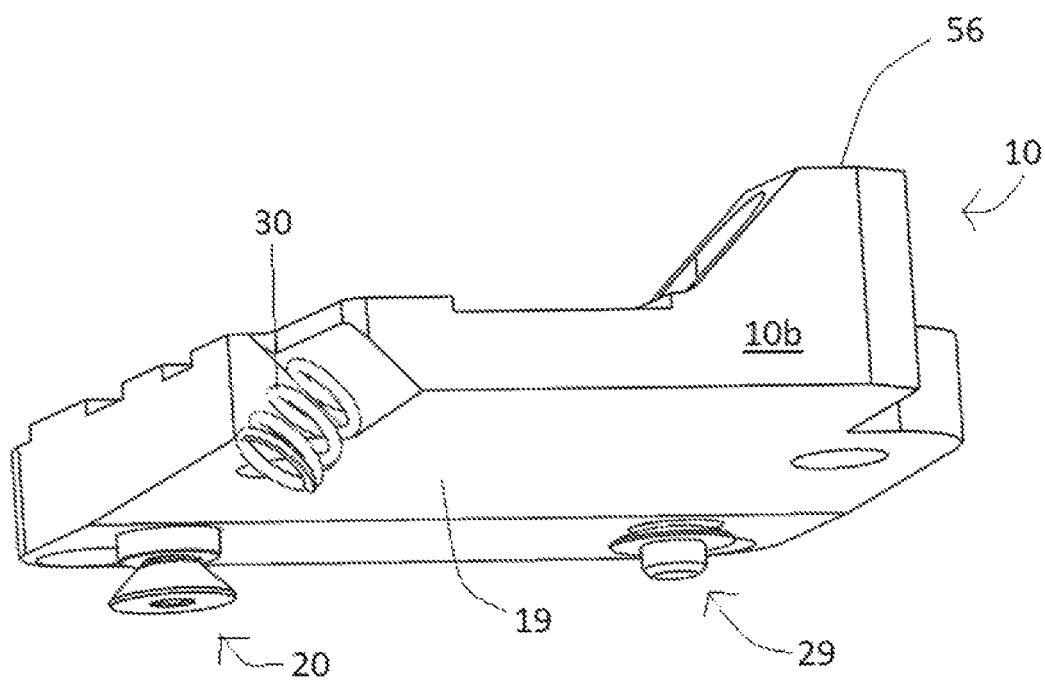
FIG. 7 is a schematic drawing showing resistance to roll adjustment of an alignment mechanism in accordance with embodiments of the disclosure.

FIG. 7 illustrates the structures in place to prohibit, or limit, roll of the base 10. The ball and socket linkage 20 acts as a stand to prevent the left portion 10d of the base 10 from rocking downward toward the housing 200. Similarly, the pressure plate assembly 29 acts as a stand to prevent the right portion 10c of the base 10 from rocking downward toward the housing 200. Together, the ball and socket linkage 20 and pressure plate assembly 29 work to resist roll movement of the base 10. It will be appreciated that the location of the ball and socket linkage 20 and pressure plate assembly 29 can be reversed, assuming the spring 30 and plungers 40, 50 are also reversed. That is, in an embodiment, the ball and socket linkage 20 and plungers 40, 50 (not shown in FIG. 7) must be kitty-corner.

By providing a single adjustment base 10 with a ball and socket linkage 20 and pressure plate 16 at the front portion 10a of the base 10 and a spring 30, rolling movement of the base 10 is prohibited while yaw and pitch of the base 10 are controlled via adjustment plungers 40, 50 and the spring 30. Furthermore, use of the spring 30 constantly exerting an amount of force against the spring contacting surface 12 ensures that any movement of a rangefinder chassis 300 secured within the housing 200 due to firearm recoil or transport is mitigated. In other words, because the spring 30 is never in a fully relaxed state, there is always a counter force exerted against the base 10 in the yaw and pitch directions. As a result, should the rangefinder chassis 300 move within the housing 200, the spring 30 exerts a force to move the base 10 back against the plungers 40, 50 to put the rangefinder chassis 300 back in its set position.

Although the alignment mechanism is described for use with a rangefinder chassis 300, it will be appreciate that other devices may be used with the alignment mechanism, such as, by way of non-limiting example, flashlights, aiming lasers, IR devices (e.g., flood lights, aiming lasers), and other similar devices.

While various embodiments of the alignment mechanism and rangefinder have been described in detail, it should be apparent that modifications and variations thereto are possible, all of which fall within the true spirit and scope of the invention. With respect to the above description then, it is to be realized that the optimum dimensional relationships for the parts of the disclosed technology, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An alignment mechanism comprising:
   a base having a front right quadrant, a front left quadrant, a rear right quadrant, and a rear left quadrant, wherein the base further defines a yaw axis and a pitch axis; and
   a ball and socket linkage on the base at one of the front right quadrant and front left quadrant, the ball and socket linkage at the intersection of the yaw axis and the pitch axis;
   a pressure plate assembly at the lower surface of the base at the other of the one of the front right quadrant and front left quadrant;
   a spring in contact with one of the rear right quadrant and the rear left quadrant;
   a yaw alignment surface at the other of the one of the rear right quadrant and the rear left quadrant; and
   a pitch alignment surface on one of the rear right quadrant and the rear left quadrant.

2. The alignment mechanism of claim 1, wherein the base is pivotable about the yaw axis and rotatable about the pitch axis.

3. The alignment mechanism of claim 1, wherein the ball and socket linkage is kitty-corner the yaw alignment surface.

4. The alignment mechanism of claim 1, wherein the ball and socket linkage is on the lower surface of the front left quadrant.

5. The alignment mechanism of claim 1, wherein the spring is in contact with the rear left quadrant.

6. The alignment mechanism of claim 1, wherein the spring is in contact with a spring-contacting surface, wherein the spring-contacting surface is angled from 25° to 65° relative to a bottom surface of the base.

7. A rangefinder comprising:
   a housing;
   a rangefinder chassis contained within the housing; and
   an alignment mechanism contained within the housing, wherein the alignment mechanism comprises
      a base having a front right quadrant, a front left quadrant, a rear right quadrant, and a rear left quadrant, wherein the base further defines a yaw axis and a pitch axis; and a ball and socket linkage on the base at one of the front right quadrant and front left quadrant, the ball and socket linkage at the intersection of the yaw axis and the pitch axis;

a pressure plate assembly at the lower surface of the base at the other of the one of the front right quadrant and front left quadrant;

a spring secured between the housing and a spring-contacting surface on one of the rear right quadrant and the rear left quadrant;

a yaw alignment surface on the other of the one of the rear right quadrant and the rear left quadrant; and a pitch alignment surface on one of the rear right quadrant and the rear left quadrant.

8. The rangefinder of claim 7, wherein the base is pivotable about the yaw axis and rotatable about the pitch axis.

9. The rangefinder of claim 7, wherein the ball and socket linkage is on the lower surface of the front left quadrant.

10. The rangefinder of claim 7, wherein the spring-contacting surface is at the rear left quadrant.

11. The rangefinder of claim 7, wherein the spring-contacting surface is angled from 25° to 65° relative to a bottom surface of the base.

12. The rangefinder of claim 7, further comprising a yaw adjustment plunger which passes through a first opening in the housing to contact the yaw alignment surface.

13. The rangefinder of claim 12, wherein axial movement of the yaw adjustment plunger into the housing causes the spring to increase force in a yaw direction on the spring-contacting surface.

14. The rangefinder of claim 12, wherein axial movement of the yaw adjustment plunger into the housing causes the base to pivot about the yaw axis from a first position to a second position.

15. The rangefinder of claim 7, further comprising a pitch adjustment plunger which passes through a second opening in the housing to contact the pitch alignment surface.

16. The rangefinder of claim 15, wherein axial movement of the pitch adjustment plunger into the housing causes the spring to increase force in a pitch direction on the spring-contacting surface.

17. The rangefinder of claim 15, wherein axial movement of the pitch adjustment plunger into the housing causes the base to rotate about the pitch axis relative to the horizontal adjustment plate from a first position to a second position.

18. The rangefinder of claim 7, wherein the spring exerts an amount of force against the spring-contacting surface over a range of motion of the base.

19. The rangefinder of claim 7 configured to secure to a firearm.

20. The rangefinder of claim 19, wherein the firearm is a rifle.

* * * * *